United States Patent [19]
Bhatnagar

[11] Patent Number: 6,006,996
[45] Date of Patent: Dec. 28, 1999

[54] ELECTRONIC THERMOSTAT CONTROL UNIT AND ITS USE IN MULTIPOINT TEMPERATURE CONTROLLER FOR REFRIGERATION AND HEATING SYSTEMS

[75] Inventor: Rajiv Bhatnagar, Murnbai, India

[73] Assignee: Varma Trafig Limited, New Delhi, India

[21] Appl. No.: 09/076,203

[22] Filed: May 12, 1998

[30] Foreign Application Priority Data

Oct. 16, 1997 [IN] India ............................................ 615/97
Oct. 16, 1997 [IN] India ............................................ 616/97

[51] Int. Cl.[6] .................................................. G05D 23/24
[52] U.S. Cl. ........................................ 236/78 R; 236/46 R
[58] Field of Search ................................ 236/46 R, 46 A, 236/46 C, 46 E, 78 R, 78 A, 78 B, 78 D, 94; 62/229, 126, 127, 129, 130, 160; 165/11.1, 200, 201, 287

[56] References Cited

U.S. PATENT DOCUMENTS

| | | |
|---|---|---|
| 3,666,973 | 5/1972 | Hulsman, Jr. .............................. 307/310 |
| 4,119,835 | 10/1978 | Coulmance et al. ...................... 219/501 |
| 4,137,770 | 2/1979 | Trout ..................................... 73/362 AR |
| 4,200,910 | 4/1980 | Hall ..................................... 236/46 R X |
| 4,257,238 | 3/1981 | Kountz et al. ......................... 62/229 X |
| 4,290,481 | 9/1981 | Pohl .......................................... 62/160 |
| 4,469,274 | 9/1984 | Levine ................................... 236/46 R |
| 4,504,010 | 3/1985 | Sukimoto et al. ................. 236/78 R X |
| 4,638,850 | 1/1987 | Newell, III et al. . |
| 5,205,132 | 4/1993 | Fu ..................................... 236/78 B X |
| 5,216,896 | 6/1993 | Uchida et al. ............................ 62/148 |
| 5,329,991 | 7/1994 | Mehta et al. . |
| 5,329,992 | 7/1994 | Tripp . |

*Primary Examiner*—Harry B. Tanner
*Attorney, Agent, or Firm*—Needle & Rosenberg, P.C.

[57] ABSTRACT

This invention relates to an electronic digital thermostat consisting of a single p-n junction as the temperature sensing element connected to an A-D converter, a sensitivity and Offset Correction circuit, digital comparators, digital noise filters, a control latch, an output drive and protection circuit and a solid-state switch to produce the desired output, with user input in either analogue form using a potentiometer or digital form using a switch, with calibration and control data stored in non-volatile memory, and a display unit for displaying sensed or user-set temperature.

This invention further relates to the application of the said electronic digital thermostat in a multipoint temperature controller for Refrigeration and Heating systems, using a plurality of the said electronic thermostat control units with a logic circuit, Central Control Unit, System Timers, and a Starting Relay circuit to provide application-specific functions.

The implementation is also shown in the form of an Application Specific Integrated Circuit (ASIC) to provide reduced size and cost.

29 Claims, 14 Drawing Sheets

ELECTRONIC THERMOSTAT CONTROL UNIT AND ITS USE IN MULTIPOINT TEMPERATURE CONTROLLER FOR REFRIGERATION AND HEATING SYSTEMS

This invention relates to an electronic digital thermostat control unit and its use in a Multipoint Temperature Controller for Refrigeration and Heating Systems.

BACKGROUND

Electrical controls in refrigeration/heating systems basically comprise a simple thermostat, motor starting relay and an over load protector for controlling the motors. Larger models also incorporate a timer and a simple logic to control an electric heater (for the automatic defrost function). Some expensive models include one or more solenoids or motors to control blowers/air flow vanes for automatic temperature control in additional compartments of the unit.

The traditional apparatus for measuring and controlling temperatures in thermostats, consists of:
  i. Gas/liquid filled capillaries in which the expansion/contraction of the gas/liquid with change in temperature is used to determine/control the temperature.
  ii. Bi-metallic elements in which the deflection/deformation of a bi-metallic strip of two metals with widely different coefficients of thermal expansion, determines the temperature sensed by it.
  iii. Mechanical bellows that are mechanically pushed by the expanding gas/liquid and that in turn move the mechanical contact and actuate the electrical circuit at a definite 'set' value.
  iv. The deflecting bi-metallic strips itself performs the function of a moving mechanical switches that controls the electrical circuit.

These traditional methods/apparatus suffer from the following drawbacks:
  a. Imprecise and imperfect sensing of temperatures
  b. Low reliability Analog thermostat units are also known in the art, see for instance the U.S. Pat. Nos. 3,666,973, 4,119,835, 4,137,770, 4,290,481, 4,638,850, 5,520,327, 5,528,017 and 5,592,989. However they suffer from the following drawbacks:
i) Tendency to drift with temperature and time
ii) Variation from unit to unit in behaviour owing to the effect of tolerances in component values and characteristics
iii) Sensitivity to noise Use of silicon diode for sensing temperature is also known, see for instance the U.S. Pat. No. 4,137,770 wherein a forward biased silicon diode is used in a bridge circuit for sensing the temperature. The analog thermostat described in this said US patent is useable only for a fixed temperature and not for a variable temperature. Further, the use of the silicon diode for sensing temperature has a difficulty in its calibration over a temperature range. These limitations have not been addressed in the said US patent.

Electronic digital thermostats are also available for use. These thermostats have been described, for instance, in U.S. Pat. Nos. 5,329,991; 5,107,918; 4,948,044; 4,799,176; 4,751,961; and 4,669,654. However, these electronic digital thermostats use expensive temperature sensors such as thermistors, thermocouples or platinum resistance thermometers. These sensors require complex and expensive interface circuits. This has made these thermostats unacceptable for use in all but the most expensive models of the refrigerators. In addition, many of the benefits of electronic thermostats, such as improved reliability of operation, are not effectively realized, when these are used with the conventional starting relay, over load protector, defrost timer, and the like. Replacing each of these elements with electronic equivalents or providing energy saving and other useful end-user functions, has so far proved to be economically viable in only the most expensive models of refrigeration units Conventional over load protection mechanisms are based on one of the following mechanisms:
  a. Bi-metallic elements in which the deflection/deformation of a bi-metallic strip of two metals with widely different coefficients of thermal expansions, determines the temperature sensed by it. The mechanical dimensions and profile of the bi-metallic strip determines the temperature at which the thermal trip action occurs to perform the over load protection function.
  b. Positive temperature coefficient (PTC) resistance elements, the electrical resistance of which increases dramatically with increase in temperature beyond a certain 'threshold' temperature, so that the resistance element effectively reduces the current in the electrical circuit to an insignificant value.

Both these methods have drawbacks. The bi-metallic over-load protector is a mechanically moving part that experiences electrical arcing every time it breaks the electrical circuit, causing electrical interference while at the same time resulting in corrosion of the contacts.

The PTC resistance element is similarly exposed to constant heat-cool cycles that create thermal stress and reduce reliability. At the same time, the electrical and temperature characteristics of the PTC element need to be matched with the load, in order to produce the correct electrical behaviour. This limits flexibility and is at best a compromise in terms of effectiveness, as exact matching of PTC characteristics to the load characteristics is rarely possible.

Similarly, the conventional methods of implementing the starting relay functions and the associated problems are:
  a. The use of a conventional mechanical relay, which suffers from the standard problem of electrical arcing and reduce reliability resulting from the use of a moving mechanical contact to make/break an electrical circuit.
  b. The use of a positive temperature coefficient (PTC) resisted element which suffers from the same problems that are encountered in the use of a PTC element for the over load protector function.

The conventional defrost timer in a refrigeration system is an electromechanical or motorized timer mechanism. Since it has constantly moving mechanical parts, and an arcing electrical contact, its reliability is quite limited.

Besides the problems listed above, conventional electrical controls in refrigeration systems have proved to be unwieldy and even expensive in terms of implementing multi-zone temperature control functions, that are desirable in larger refrigeration systems. In fact, some desirable functions that result in energy saving or provide useful features for the end user, are impractical to implement using such control mechanisms.

The object of this invention is to overcome the above mentioned drawbacks and provide an electronic digital thermostat which is cost effective, operationally safe and reliable.

A further object of this invention is to provide a single, multipoint compact electronic control unit by using the said electronic digital thermostat that overcomes all the above-mentioned drawbacks and provides the advantages of the expensive electronic controls currently available, at low cost.

To achieve the said objective this invention provides an electronic digital thermostat control unit which comprises:
- a p-n junction temperature sensing element,
- a constant current source to drive the said p-n junction element,
- the output of the said p-n junction element is connected to an analogue-to-digital converter to produce a digital output,
- the said digital output is connected to a circuit for correcting the sensitivity and offset values of the sensor using calibration data stored in non-volatile memory,
- the corrected output is connected to one input of at least one digital comparator and the other input of each digital comparator receives a digital reference value from the said non-volatile memory or from variable control means,
- the output of the said comparators is filtered using digital noise filters, to eliminate spurious outputs and is stored in a control latch to set/reset the input of a control latch whenever the output of digital comparator is 'true', for actuating the device in the consumer/industrial product that performs the temperature correction.

The output of the said control latch is connected to an output drive and protection circuit which monitors the load conditions continuously and deactivates the drive to the solid state switch, if overload conditions are encountered in the said consumer/industrial product. These overload conditions means thermal overload, over-current and turn-on inrush current conditions. Accordingly, the Output Drive and Protection Circuit includes a Thermal Protection circuit, an Over-current Protection Circuit and a 'Soft Start' circuit. The Thermal Protection Circuit monitors the temperature of the load, while the Over-current Protection Circuit monitors the current drawn by the load, and the soft start circuit provides an effective reduced voltage start-up to the load during the initial period of the turn-on and thereby decreases the inrush current stress produced on the load in the case of motor and heater loads.

The temperature display unit is connected to one of the inputs of the said digital comparator(s) which receives its input from the output of the sensitivity and offset correction circuit and a selection switch permits the selective display of either the sensed temperature or the reference value from the digitized output from the potentiometer/switch.

A variable control means is provided in series with analogue-to-digital converter for varying the reference digital value fed to the digital comparator through a multiplexer for adjustment of the control limits of the temperature. The said variable control means is a potentiometer or switch which is connected to a switch debounce circuit and digital counter to remove spurious switch transitions and to increment/decrement a digital counter, the output of which is connected to the input of a digital multiplexer to determine whether the user control signal from the potentiometer/switch or the constant value from the non-volatile memory is to be used as a reference value for the digital comparator.

The output of the digital multiplexer is controlled by the signal from the selector switch through a switch debounce circuit.

The said digital comparator compares the corrected and sensed temperature with the reference value and generates a 'true'/'false' output to set/reset a control latch after filtering through noise filters to eliminate spurious outputs.

One of the digital comparators receives a fixed reference value from the non-volatile memory and the other digital comparator receives its reference value either from the non-volatile memory or from a user variable control depending upon the state of a selector switch that toggles the selection.

The power supply used for powering the electronic digital thermostat control unit preferably consists of a low loss capacitive voltage dropping network followed by a voltage clamping device, a rectifier and a filter network to provide a D.C. voltage. The said D.C. power supply provides an output in the 3–6 volts range.

A clock oscillator is connected to each circuit of the electronic digital thermostat control unit for providing the timing signals for the operation of each circuit. The said clock oscillator is a quartz clock oscillator operating in the 4–8 MHz frequency range.

The entire control circuit is implemented as a custom Application Specific Integrated Circuit (ASIC) to provide a miniature and cost effective thermostat excluding the sensor, a variable user control potentiometer/switch, the selector switch, temperature display unit and the solid state switch.

In other embodiments the said ASIC excludes non-volatile memory, clock circuit and the power supply in order to provide larger non-volatile memory capacities for storage of temperature data and interfaces to different types and sizes of displays in one embodiment and in other embodiment further excludes the output drive and protection circuit in order to facilitate the use of higher power solid state switch, or to provide flexibility of control in multipoint applications.

To achieve the second objective this invention provides an electronic multi-point temperature control unit comprising:
- a plurality of electronic thermostat control units as described above having a common non-volatile memory that stores reference and calibration data, for controlling the temperature in the required number of places in the refrigeration/heating systems, wherein
- the outputs from the control latch units of the said electronic thermostat units are connected to logic circuit which selectively connects the outputs to one or more Output Drive and Protection Circuits using the data stored separately in the non-volatile memory of the electronic thermostat unit, the said Output Drive and Protection circuits drive and monitor the load, through solid state switches.
- a central control unit connected to:
  i each of the said outputs from the control latch units of electronic thermostat control units and the inputs of the said output drive and protection circuits for enabling or disabling the said electronic thermostat control units and output of said drive and protection circuits depending upon the combination of the output from the electronic thermostat control unit and the user control input received from the potentiometer or digital counters, as well as the occurrence of fault conditions.
  ii. a system timers unit which generates the timing signals for enabling/disabling one or more of the said Output Drive and protection circuits during special modes of operation,
  iii. a starting relay circuit which provides the signals required to control one or more output drive and protection circuits at the time when the said load is to be switched on.

Any one or more of the Output Drive and Protection Circuit includes a thermal protection circuit, an over-current protection circuit and a 'Soft Start' circuit, the thermal protection circuit monitors the temperature of the load, while the over-current protection circuit monitors the current drawn by the load and the 'Soft Start' circuit provides an effective reduced voltage start-up to the load, during the initial period of the turn-on, and thereby decreases the in-rush current stress produced on the load in case of motor and heater loads.

The said Central Control Unit is a logic circuit for implementing special functions e.g. Automatic Defrost and Quick-Freeze in the case of Refrigerators, and Timed Heating Cycles in case of Heating Systems.

A display unit is connected to the output of one of the said electronic thermostat control units for displaying temperature.

At least one switch is connected through a switch debounce circuit and a digital counter to the input of the said central control unit for providing the user control signal required to operate the said electronic multi-point temperature control unit.

The entire control circuit is implemented as a custom Application Specific Integrated Circuit (ASIC), to provide a miniature and cost effective electronic multipoint temperature control unit, excluding the sensors of the electronic thermostat control units, variable user control switch(es), selector switch, temperature display unit, power supply and solid state switches.

In another implementation, the said ASIC excludes non-volatile memory, clock circuit and the power supply in order to provide larger non-volatile memory capacities for storage of temperature data and interfaces to different types and sizes of displays.

The invention will now be described with reference to the accompanying drawings:

FIG. 1(*a*) shows the output drive and protection circuit in the electronic digital thermostat control unit.

FIG. 8(*a*) shows the Output Drive and protection Circuit in electronic multipoint temperature control unit.

Figure 1:
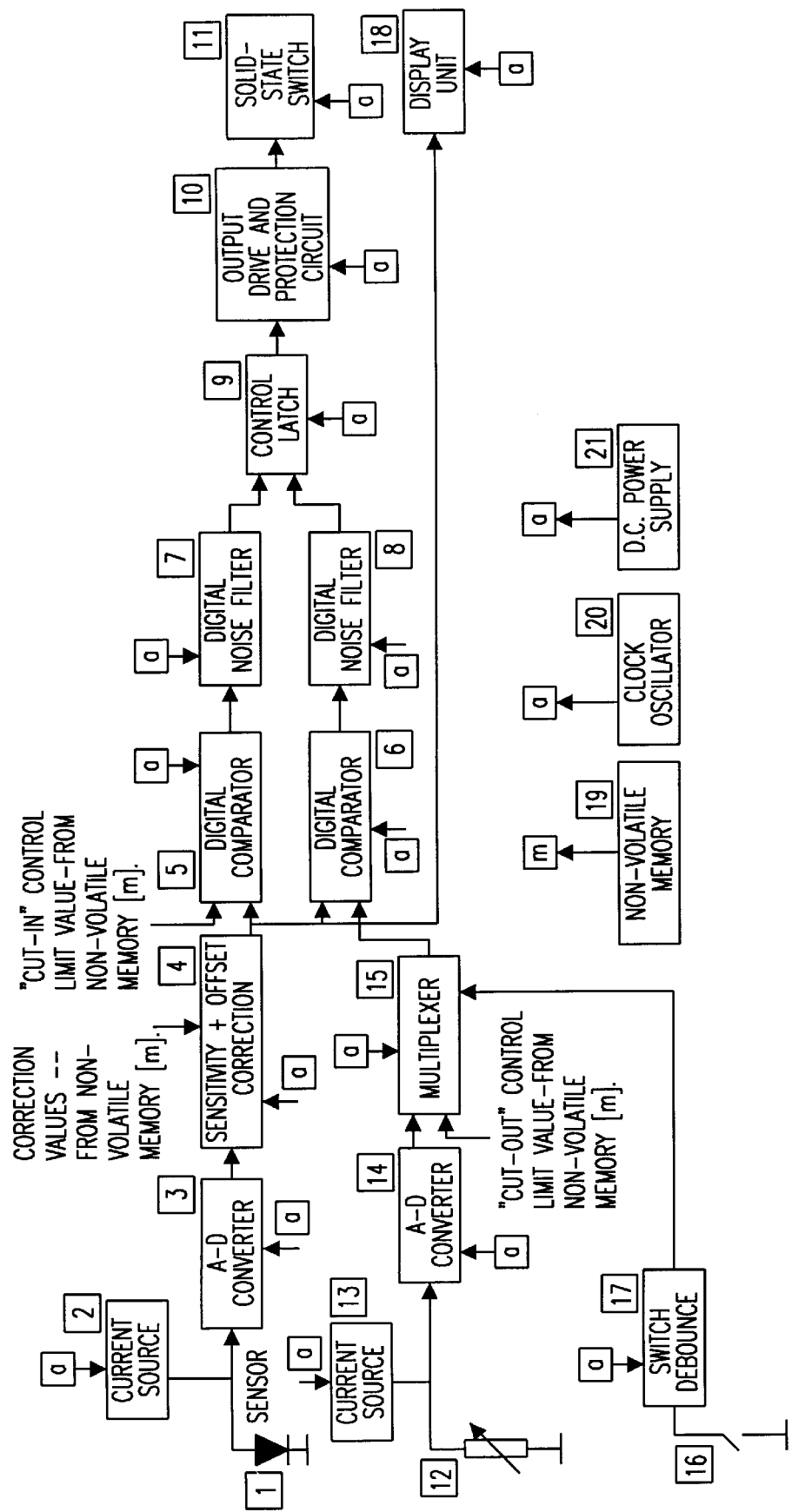
FIG. 1 shows the electronic digital thermostat control unit according to this invention using a potentiometer for varying the temperature control value.
Figure 1A:
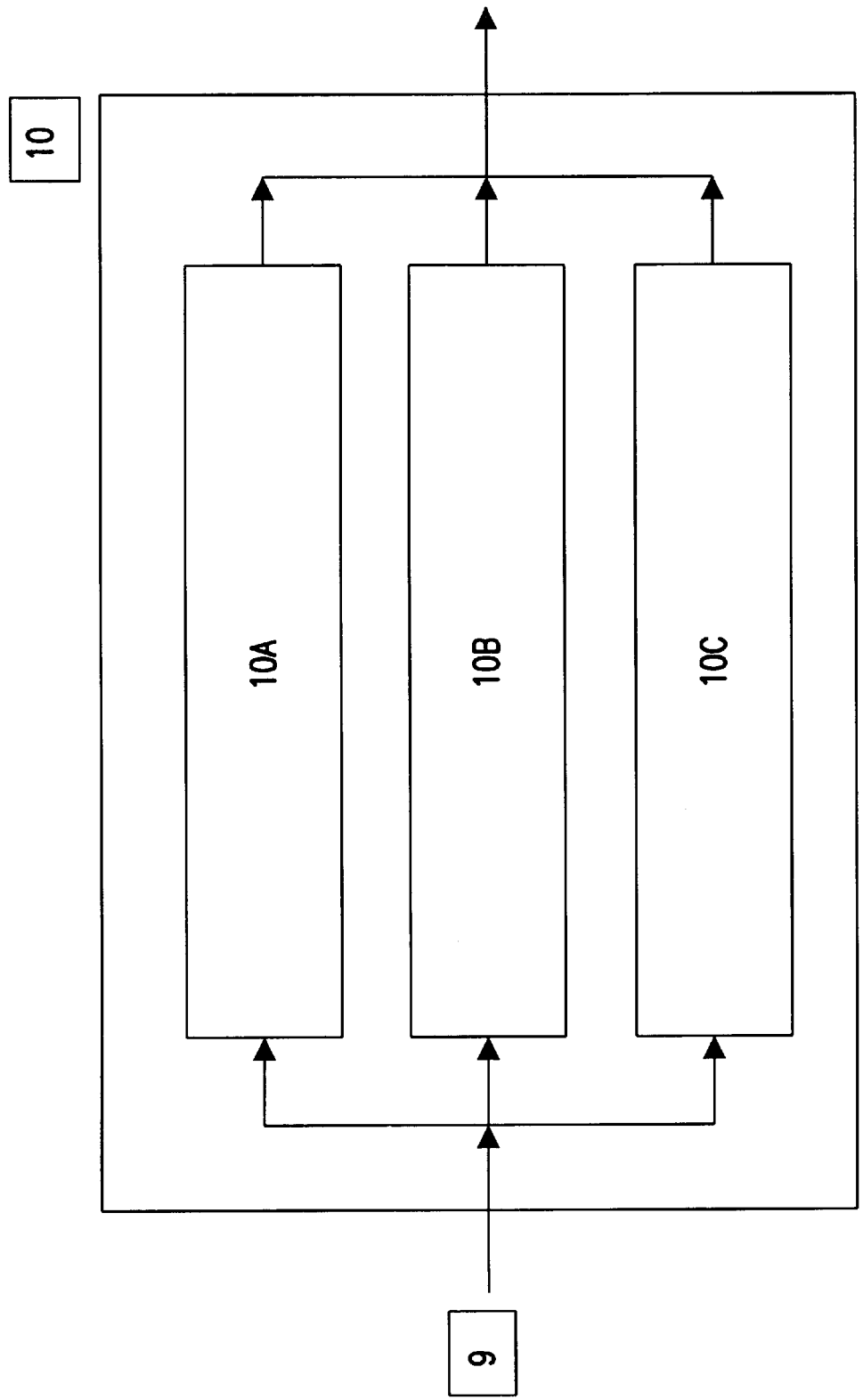

Referring to FIGS. 1 and 1(*a*), item (1) shows a sensor consisting of a single semi-conductor p-n junction (eg. a diode). A constant current source (2) provides the bias current for the said sensor (1). The signal from the sensor (1) which is an analogue D.C. voltage that decreases linearly with the temperature is converted to digital form by an analogue-to-digital converter (3). The digital output is adjusted for sensor offset and sensitivity by a sensitivity and offset correction digital circuit (4) that receives the correction factor data in digital form from a non-volatile memory (19) This digital output is applied to digital comparators (5 & 6). Each digital comparator receives a digital reference value along with the digital value received from the sensitivity and offset correction digital circuit (4) at its input terminals. The digital comparator (5) receives a fixed value from the non-volatile memory (19) and the other digital comparator (6) receives its reference value from either the non-volatile memory (19) or from a user-variable control (12) depending on the on/off state of selector switch (16). In the case where the user control variable is a potentiometer (12), the DC voltage from the potentiometer is fed to an analogue-to-digital converter (14) that converts it to a digital value suitable for digital comparator (6). A constant current source (13) drives the potentiometer (12) to ensure an output that is independent of power supply fluctuations. The output of the analogue-to-digital converter (14) is fed to a digital multiplexer (15) that determines whether the user-control signal from the potentiometer, or the constant value from the non-volatile memory is to be used as the 'cut-out' reference for the digital comparator (6). The digital multiplexer (15) receives its control input from the output of the Switch Debounce circuit (17) which interfaces the selector switch (16). The output of the two digital comparators (5 & 6) are passed through digital noise filters (7 & 8) to remove spurious outputs and then applied to the inputs of a control latch (9) which controls the output drive and the protection circuit (10). The output drive and protection circuit (10) which includes the 'Soft Start ' circuit (10A), thermal over-load protection circuit (10B) and over-current protection circuit (10C) drives the Solid State Switch (11) to actuate the relevant device in the consumer/industrial appliance to correct the temperature and minimize the in-rush current stress produced on the load in case of motor and heater loads as well as protect against over-heat and current over-load conditions. The output of sensitivity and offset correction digital circuit (4) is also brought out for displaying the sensed temperature on a display unit (18). A clock circuit (20) and a power supply (21) is connected to the entire circuit as shown in FIG. 1.

Figure 2:
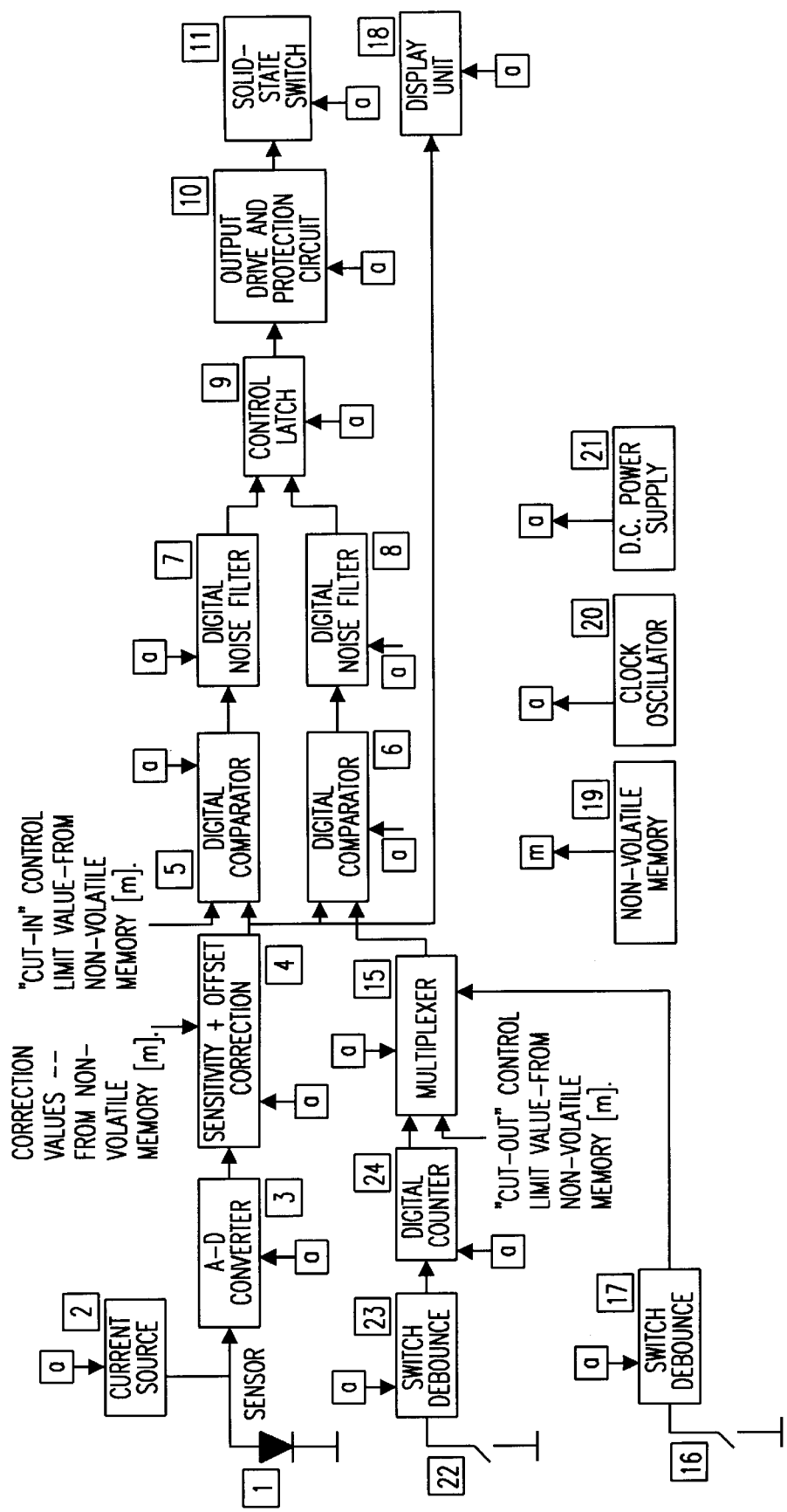
FIG. 2 shows an alternate embodiment of the unit using a switch to vary the temperature control value.

In FIG. 2, the user variable control originates from a switch (22) instead of a potentiometer (12). The signal from the switch (22) is fed to Switch Debounce circuit (23) that feeds a pulse on every switch depression to a digital counter (24) which represents the selected control limit value supplied to the digital comparator (6) through digital multiplexer (15), which determines whether the output of the digital counter (24) or the fixed value from the non-volatile memory (19) is supplied to the input of the digital comparator (6). The digital multiplexer (15) receives its control input from the output of the Debounce switch (17) that interfaces the selector switch (16).

Figure 3:
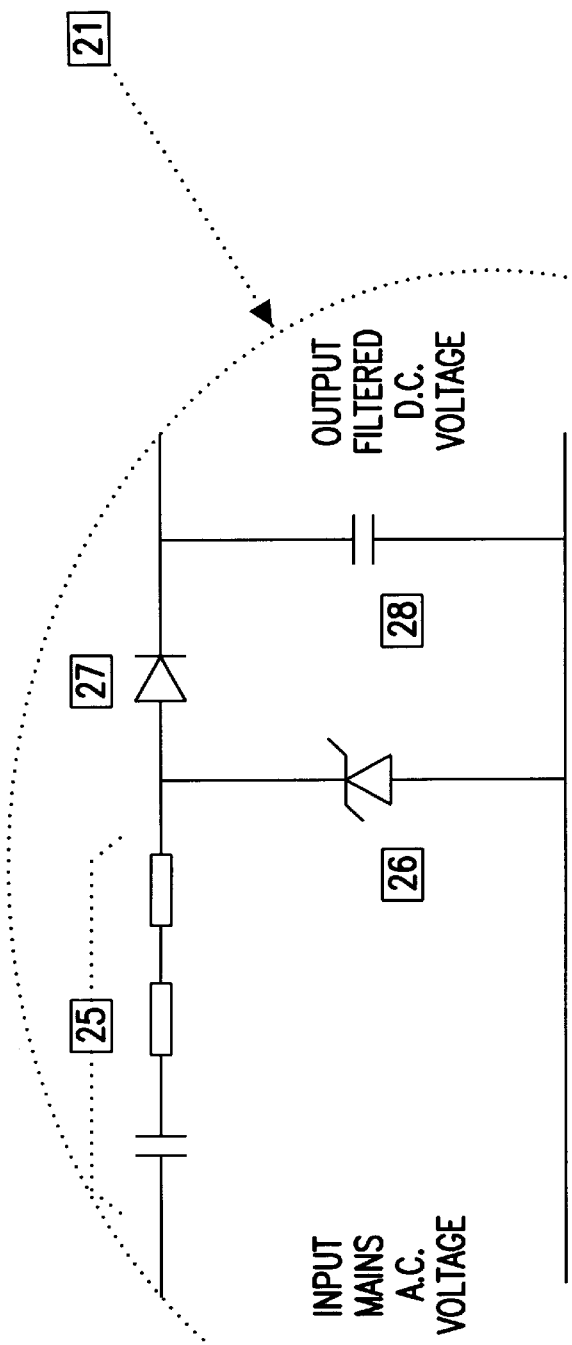
FIG. 3 shows the transformer less power supply used to provide power to the electronic thermostat unit.

FIG. 3 shows the transformer less power supply (21) of 3 to 6 volts, used to provide power to the electronic digital thermostat control unit. A capacitive voltage dropping network (25), with a voltage clamping zener diode (26) reduces the input high A.C. voltage to a low value. This low value AC voltage is then rectified by a diode (27) and then filtered by a capacitor (28) to produce a low voltage D.C. supply that feeds power to the circuit.

Figure 4:
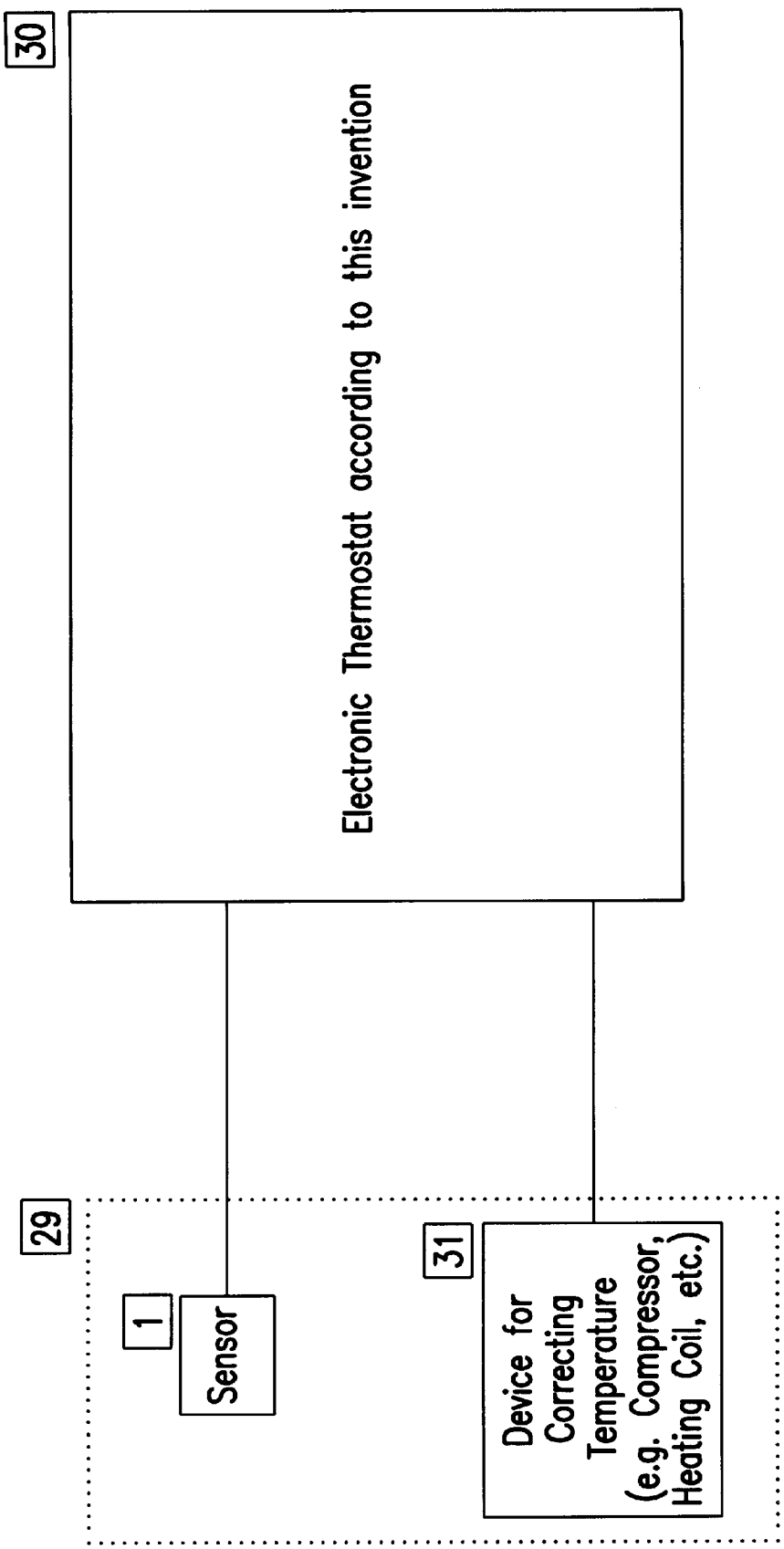
FIG. 4 shows an application of the electronic thermostat control unit.

FIG. 4 shows an application of the electronic digital thermostat control unit. The sensor element (1) is placed inside the appliance (29), the temperature of which is to be controlled (eg. Refrigerator in case of consumer goods, or engine coolant casing, in the case of an industrial/automotive application). The sensor (1) is located remotely from the electronic digital thermostat control unit (30). Similarly, the device (31) which is to be actuated by the electronic digital thermostat control unit to provide the temperature correction to the compressor motor in the case of refrigerator or the radiator cooling fan/cooling pumps in the case of an air cooled or water cooled engine is located remotely.

Figure 5:
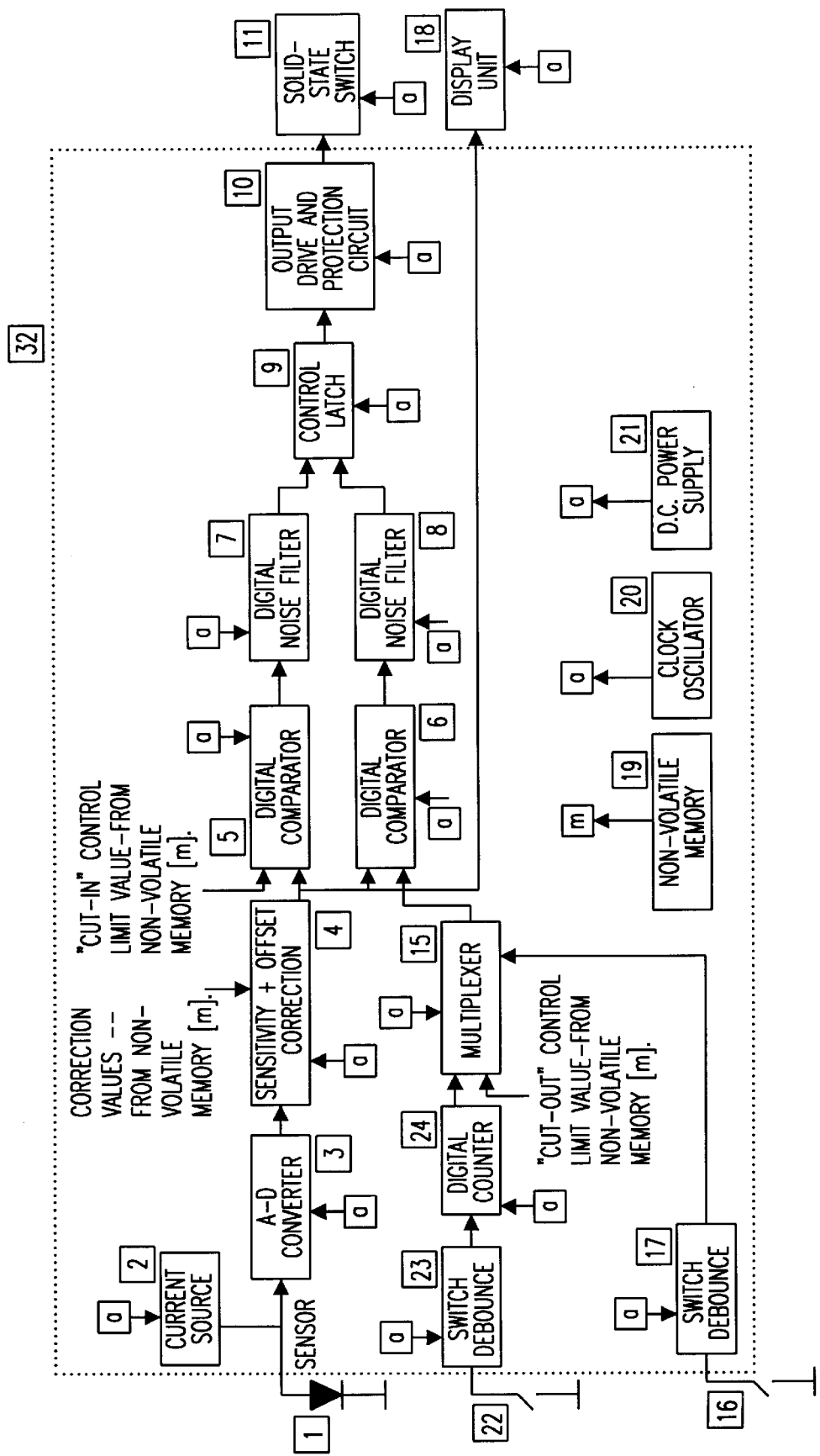
FIG. 5 shows an embodiment in which the entire control circuit is implemented as an Application Specific Integrated Circuit (ASIC) excluding the sensor, variable user control potentiometer/switch, selector switch, temperature display unit and solid state switch.

FIG. 5 shows an implementation of the electronic digital thermostat control unit in the form of a custom Application Specific Integrated Circuit (ASIC) (32) to provide a solution that is both very miniature and cost effective. The sensor (1) connects to the ASIC. Similarly, the solid state switch (11) connects to the output of the ASIC. The two switches (16 & 22) for the selection of the 'cut-out' temperature and the setting of the control limit are also connected separately to the ASIC (32). The display unit (18) is directly connected to the ASIC (pins) and driven by it separately.

Figure 6:
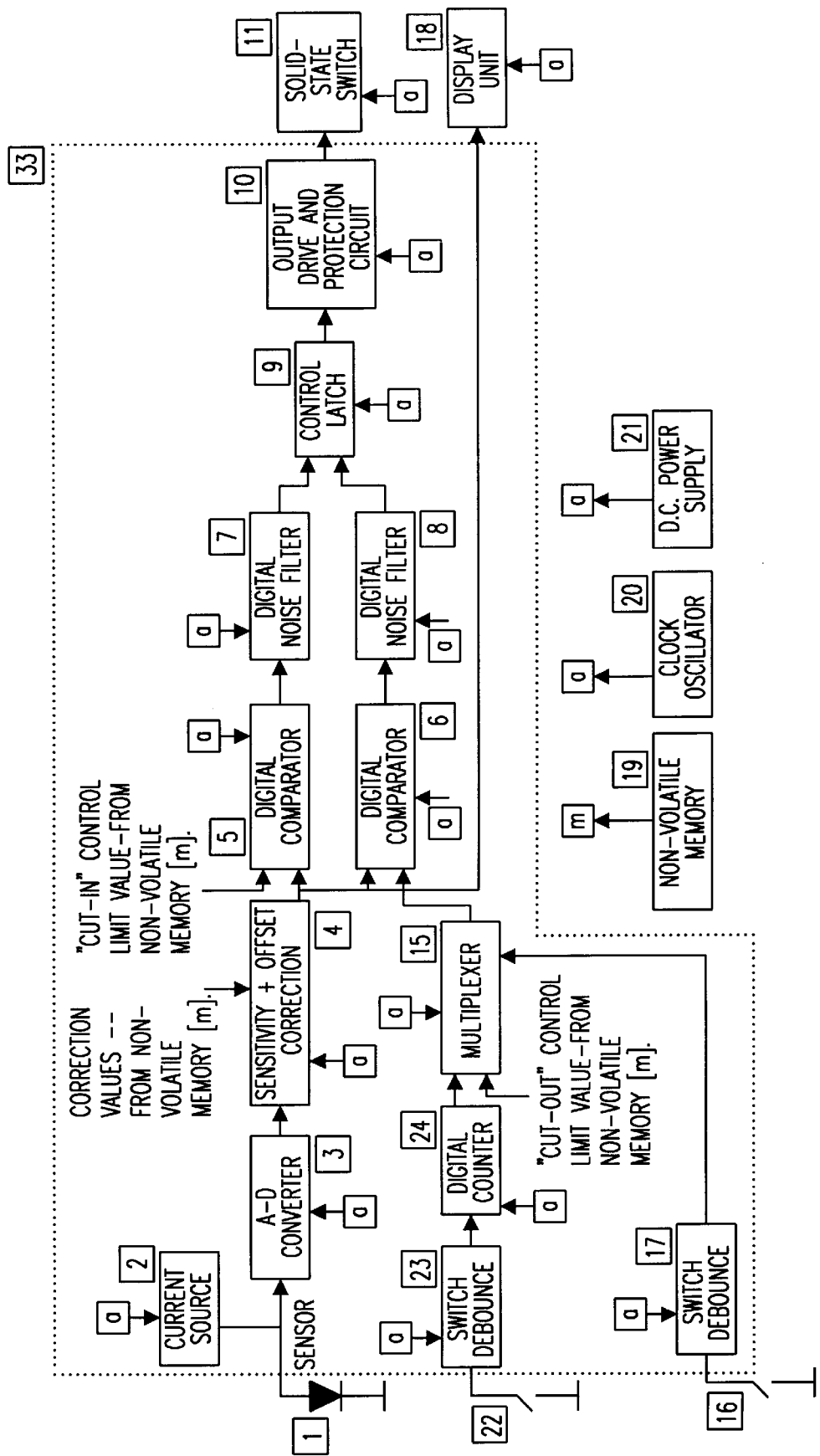
FIG. 6 shows an alternative embodiment in the form of ASIC in which the non-volatile memory, clock oscillator and DC power supply are external to the ASIC.

FIG. 6 shows another embodiment using a ASIC (33) in which the non-volatile memory (19), clock oscillator (20) and the power supply (21) are external to the ASIC in order to provide for larger non-volatile memory capacities and interfaces to several different types and sizes of displays. The larger capacity of the non-volatile memory (19) permits more storage of temperature data.

Figure 7:
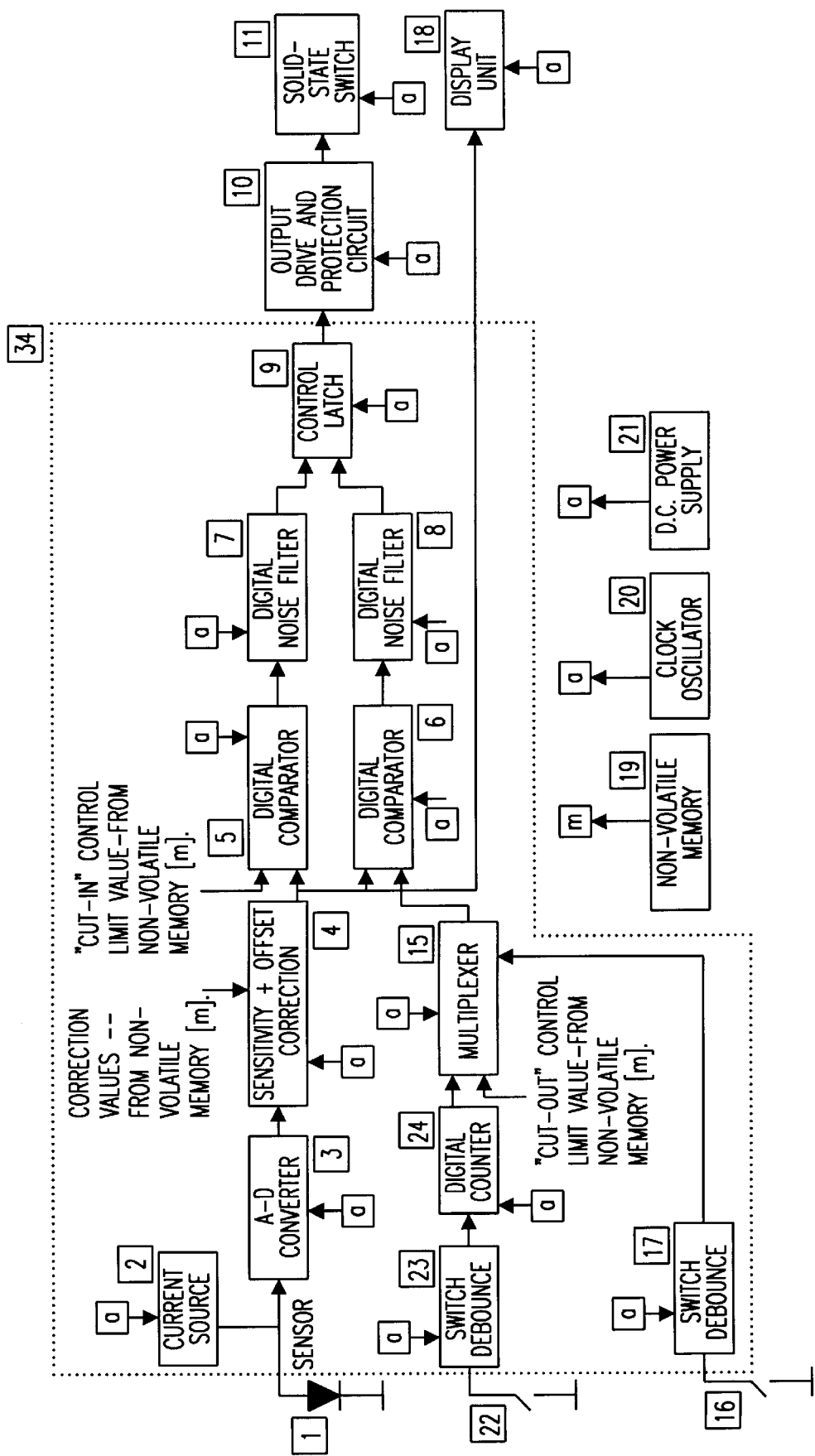
FIG. 7 shows yet another embodiment in the form of ASIC in which the nonvolatile memory, clock oscillator, DC power supply and output drive and protection circuit are external to the ASIC.

FIG. 7 shows yet another embodiment of the electronic digital thermostat control unit in the form of ASIC (34), wherein the putout drive and protection circuit (10) is also external in order to facilitate the use of higher power solid state switches that require more drive current than is provided by a single chip. This enables the control of significantly higher capacity loads.

Working:

A sensor consisting of a single semi-conductor p-n Junction diode (1) under a constant current bias provided by a constant current source (2) produces a DC voltage that decreases in direct proportion to the increase in the sensed temperature. This DC voltage is fed to the input of an analogue-to-digital converter (3). The analogue-to-digital converter produces a digital output that is equal to the DC voltage supplied at its input. This digital output is then fed to the input of a sensitivity and offset correction digital circuit (4) that corrects it for sensor offset and sensitivity by applying a correction factor that is received by it in digital form from non-volatile memory (19). This produces a corrected, sensed temperature value.

This corrected sensed temperate value is applied to the one input of each of the digital comparators (5 & 6). Digital comparator (5) receives a fixed 'reference' value from the non-volatile memory (19) at its other input. The corrected, sensed temperature value received from the sensitivity and offset correction digital circuit (4) is compared with the 'reference' value by digital comparator (5) and a 'true'/'false' output is generated. The output of digital comparator (5) is fed to a digital noise filter (7) in order to eliminate spurious outputs. The filtered output from the digital noise filter (7) is applied to the 'reset' input of a control latch (9). The control latch is thus reset whenever the output of digital comparator (5) is 'true'.

The other digital comparator (6) receives its 'reference' value from either the non-volatile memory (19) or from a user variable control (12) depending upon the state of selector switch (16), that toggles the selection. In the case where the user-variable control is a potentiometer (12), the DC voltage from the potentiometer is fed to an analogue-to-digital converter (14) that converts it to a digital value suitable for digital comparator (6). A constant current source (13) drives the potentiometer to ensure its output is independent of power supply fluctuations. The output of the analogue-to-digital converter (14) is fed to a digital multiplexer (15) that determines whether the user-control signal from the potentiometer (12), or the constant value from the non-volatile memory (19), is to be used as the reference for the digital comparator (6).

Where the user control is supplied from a switch (22) instead of potentiometer (12) (see FIG. 2), the switch signal is first passed through a switch debounce circuit (23) to remove spurious switch transitions, and then used to increment/decrement a digital counter (24). The output ot the digital counter (24) is then applied to the input of digital multiplexer (15) which determines whether the user-control signal from the switch (22), or the constant value from the nonvolatile memory (19), is to be used as a 'reference' value for the digital comparator (6).

The output of digital multiplexer (15) is controlled by the signal from selector switch (16) after processing by the switch debounce circuit (17) to remove spurious switch transitions. Digital comparator (6) compares the corrected. sensed temperature value with the reference value and generates a 'true'/'false' output that is used to 'set' control latch (9) after filtering through digital noise filter (8) to eliminate spurious outputs.

The control latch (9) outputs a digital signal that enables/disables the output drive and protection circuit (10). The output drive and protection circuit (10) generates the signals necessary to drive the solid state switch (11) in order to actuate the relevant device in the consumer/industrial appliance to correct the temperature. The output drive and protection circuit (10) which contains the thermal overload protection circuit (10B) and current over-load protection circuit (10C), monitors the load conditions continuously and deactivates the drive to the solid state switch (11) if thermal or current overload conditions are encountered. The Output Drive and Protection Circuit also includes a 'Soft Start' circuit (10A) to provide an effective reduced voltage start-up to the load, during the initial period of the turn-on, and thereby decreases the in-rush current stress produced on the load in case of motor and heater loads.

The output of the sensitivity and offset correction digital circuit (4) is also brought out for displaying the sensed temperature on a display unit (18). A selection switch (not shown), connected to the input of the display unit (18) also enables a selective display of either the sensed temperature, as indicated by the output from the sensitivity and offset correction digital circuit (4), or the user-selected reference temperature as determined by the signal at the output of the digital multiplexer (15). A clock oscillator circuit (20) based on a quartz crystal oscillator in the 4–8 MHz frequency range generates all the timing signals necessary to operate each circuit block, while a power supply (21) supplies the required voltage and current to each circuit block of the electronic digital thermostat control unit.

Figure 8:
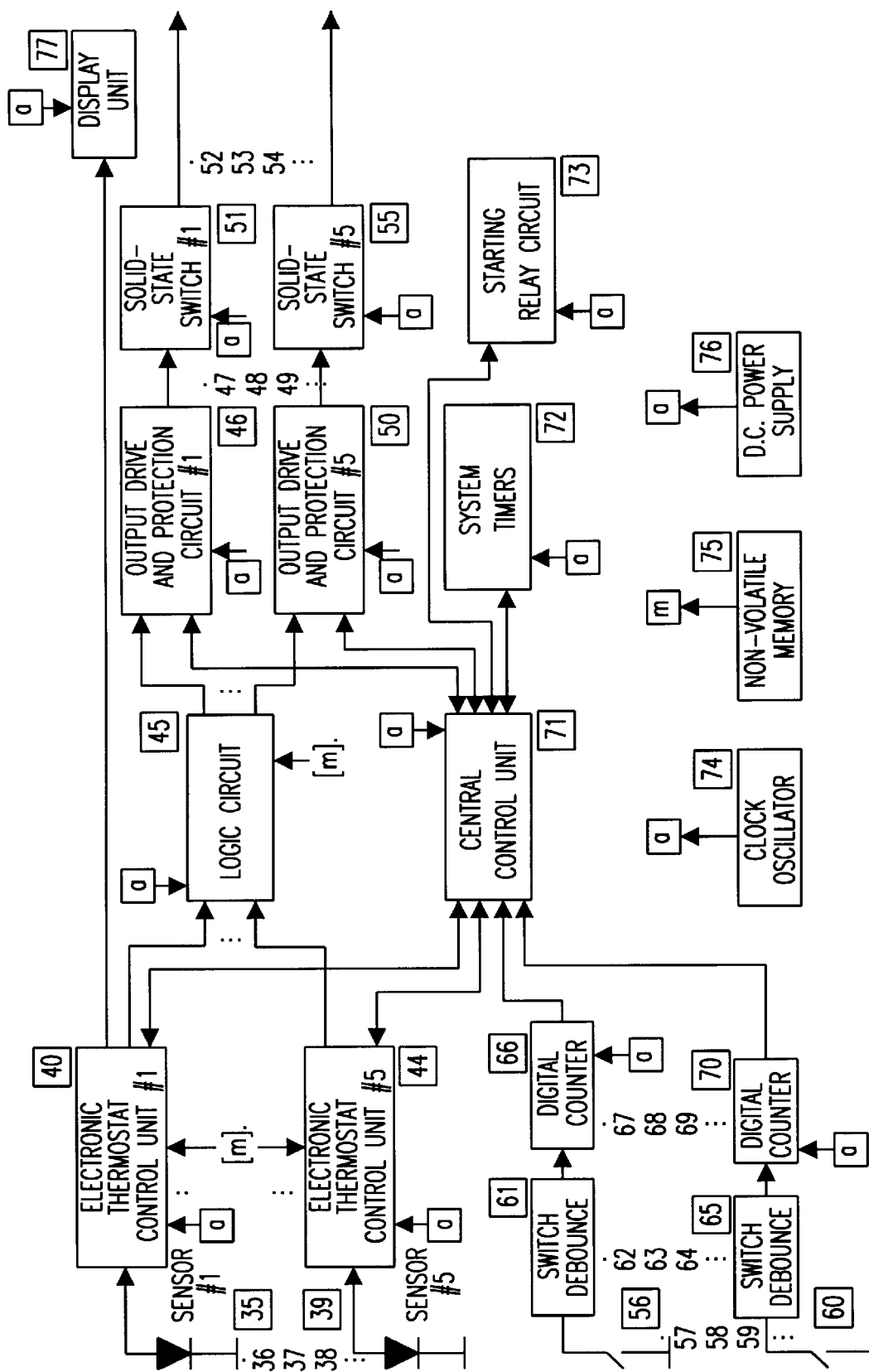
FIG. 8 shows the electronic multi-point temperature control unit using five electronic thermostat control units having a common non-volatile memory.
Figure 8A:
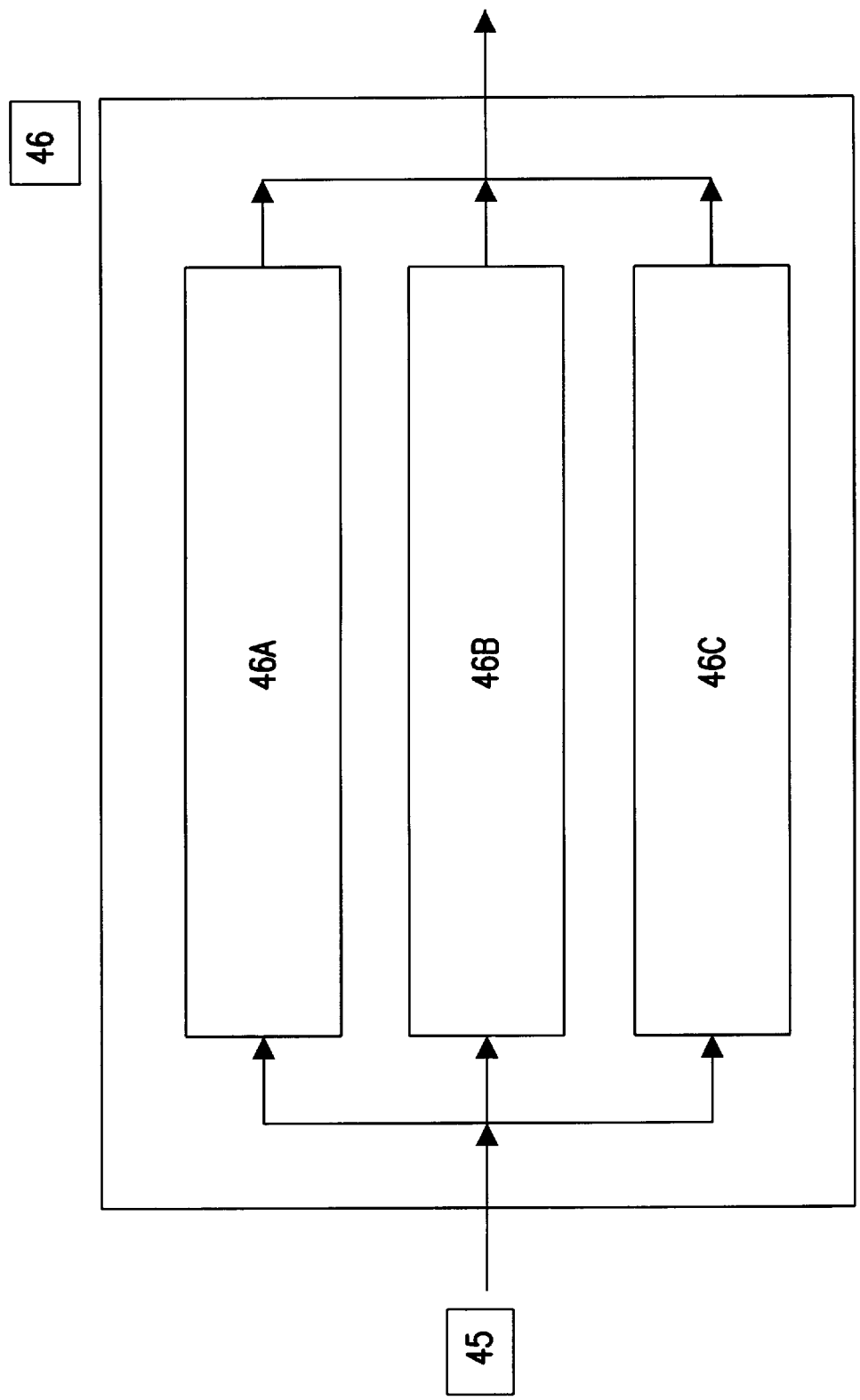

In FIGS. 8 and 8(a), the electronic multipoint temperature control unit is shown wherein items (35) to (39) show single-PN-junction (eg. diode) temperature sensors connected to electronic thermostat control units (40) to (44) having a common non-volatile memory (75) that stores reference and calibration data. The outputs from control latch units of the electronic thermostat control units are connected to a logic circuit (45) which selectively connects these outputs to the inputs of one or more output drive and protection circuits (46 to 50) using the data stored separately in the said non-volatile memory (75). The output from each output drive and protection circuit goes to solid state switches (51) to (55) which perform the ON/OFF action on the load (e.g. Refrigerator compressor motor, blower, defrost heater and the like). Any one or more of the Output Drive and Protection Circuits includes a 'Soft Start' circuit (46A), thermal over-load protection circuit (46B) and over-current protection circuit (46C) to provide

- an effective reduced voltage start up to the load, during the initial period of the turn-on, and thereby decreases the in-rush current stress produced on the load in case of motor and heater loads.
- protection against thermal and current over-load conditions.

The central control unit (71) selectively enables or disables the electronic thermostat control units (40) to (44), and the output drive and protection circuits (46) to (50) during fault conditions as well as during certain modes of operation (eg. 'defrost' and 'quick freeze' modes in the case of a refrigerator).

User control signals are received from one or more switches (56) to (60) located on the control panel of the unit. The signal from each switch is passed through a switch debounce circuit (61) to (65) to remove spurious output and then used to update a digital counter (66) to (70). The outputs from the digital counters are connected to inputs of the central control unit (71) and provide the user control data required to control the operation of the electronic multi-point temperature control unit. The output of the system timer unit (72), which contains electronic timers for special functions such as automatic defrost and 'quick freeze', 'door open alarm', 'automatic fault reset' features in the case of a refrigerator application or 'water fill timer', 'milk fill timer', 'automatic turn-on at preset time' and 'automatic turn-off at preset time' features in the case of the coffee vending machine, connects to an input of the central control unit (71), and provides signals that determine control actions for enabling or disabling the electronic thermostat control units (40) to (44) and the output drive and protection circuits (46) to (50).

The Start Relay Circuit block (73) contains circuitry for delivering a timed signal to the start winding of a dual-winding electric motor such as the refrigeration unit's compressor motor. This signal is routed through the central control unit (71) to one of the output drive and protection circuit blocks.

A clock oscillator (74) of frequency 4–8 MHz, is used to provide the timing signals necessary for the operation of each circuit of the electronic multi-point temperature control unit. The said clock oscillator is the same as used in the electronic thermostat unit.

Non-volatile memory (75) is used to store all the control and calibration data required for the said electronic thermostat control units and the said logic circuit.

A power supply (76) is used for powering the electronic multi-point temperature control unit. The said power supply is connected to all the internal blocks of the unit and is the same as used in the electronic thermostat control unit.

A display unit (77) is provided at the output of one of the electronic thermostat control units.

Figure 9:
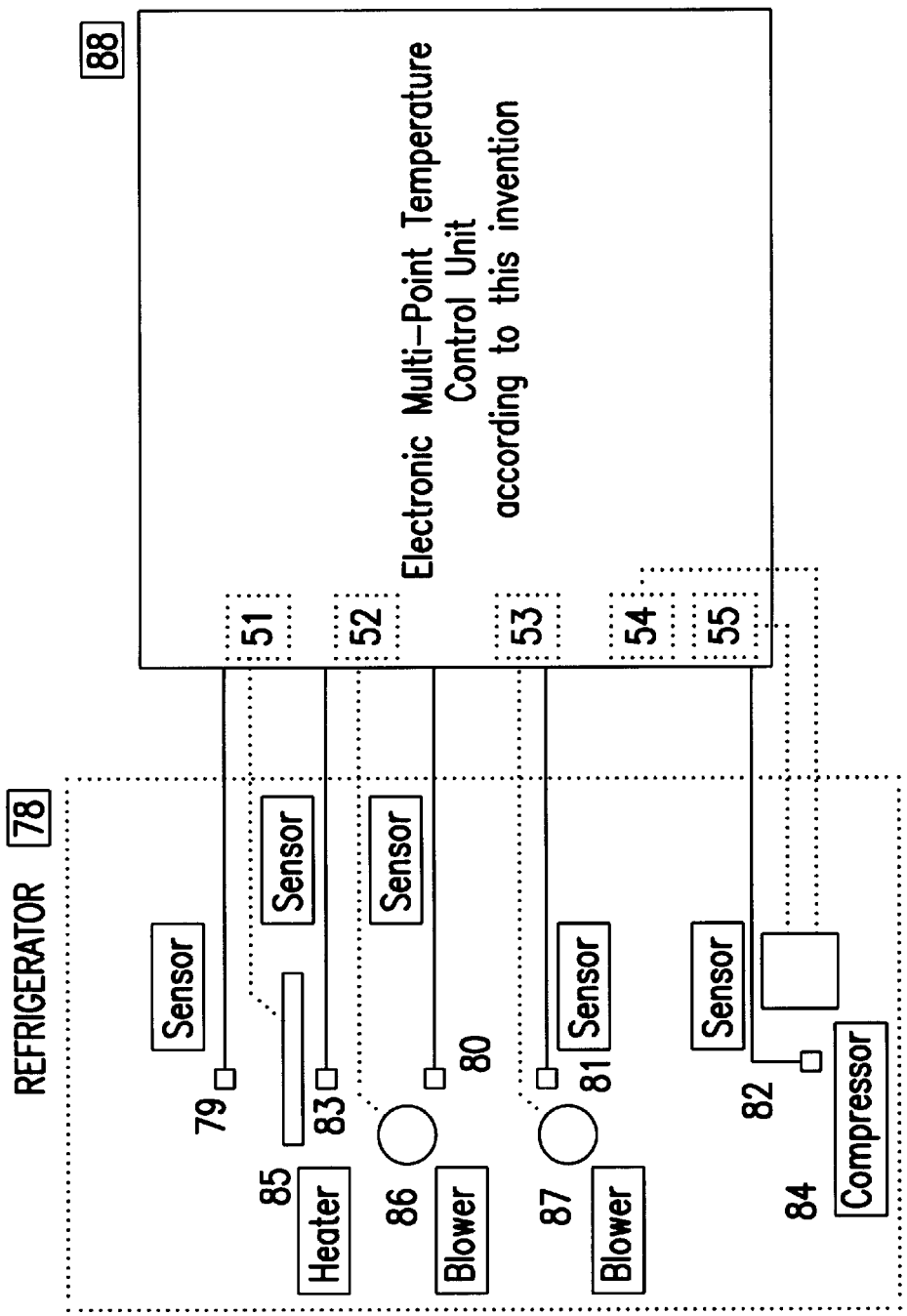
FIG. 9 shows an application of the electronic multi-point temperature control unit in a refrigerator with three separate compartments.

FIG. 9 shows an application of the electronic multi-point temperature control unit in a three-zone refrigerator (78) using five electronic thermostat control units and five output drive and protection circuits. Three temperature sensors (79) to (81) located in each of the three zones measures the temperate of the environment in each zone. In addition, a fourth sensor (82) located on the housing of the compressor (84) monitors the temperature of the compressor in order to provide a thermal overload function. A fifth sensor (83) placed next to the defrost heater element (85) enables precise temperature control during the defrost cycle. Each electronic thermostat control unit monitors the temperature in the compartment in which it is located and compares it with the specified 'cut-out' and 'cut-in' temperature, for the said compartment enabling its corresponding output drive and protection circuit whenever the monitored temperature crosses the 'cut-in' limit and disabling it whenever the monitored temperature crosses the 'cut-out' limit. The outputs from the five solid state switches (51) to (55) are connected to the compressor motor 'RUN' winding, compressor motor 'START' winding, the defrost heater element, blower #1 (86) located in one compartment of the refrigerator and blower #2 (87) located in another compartment of the refrigerator.

Figure 10:
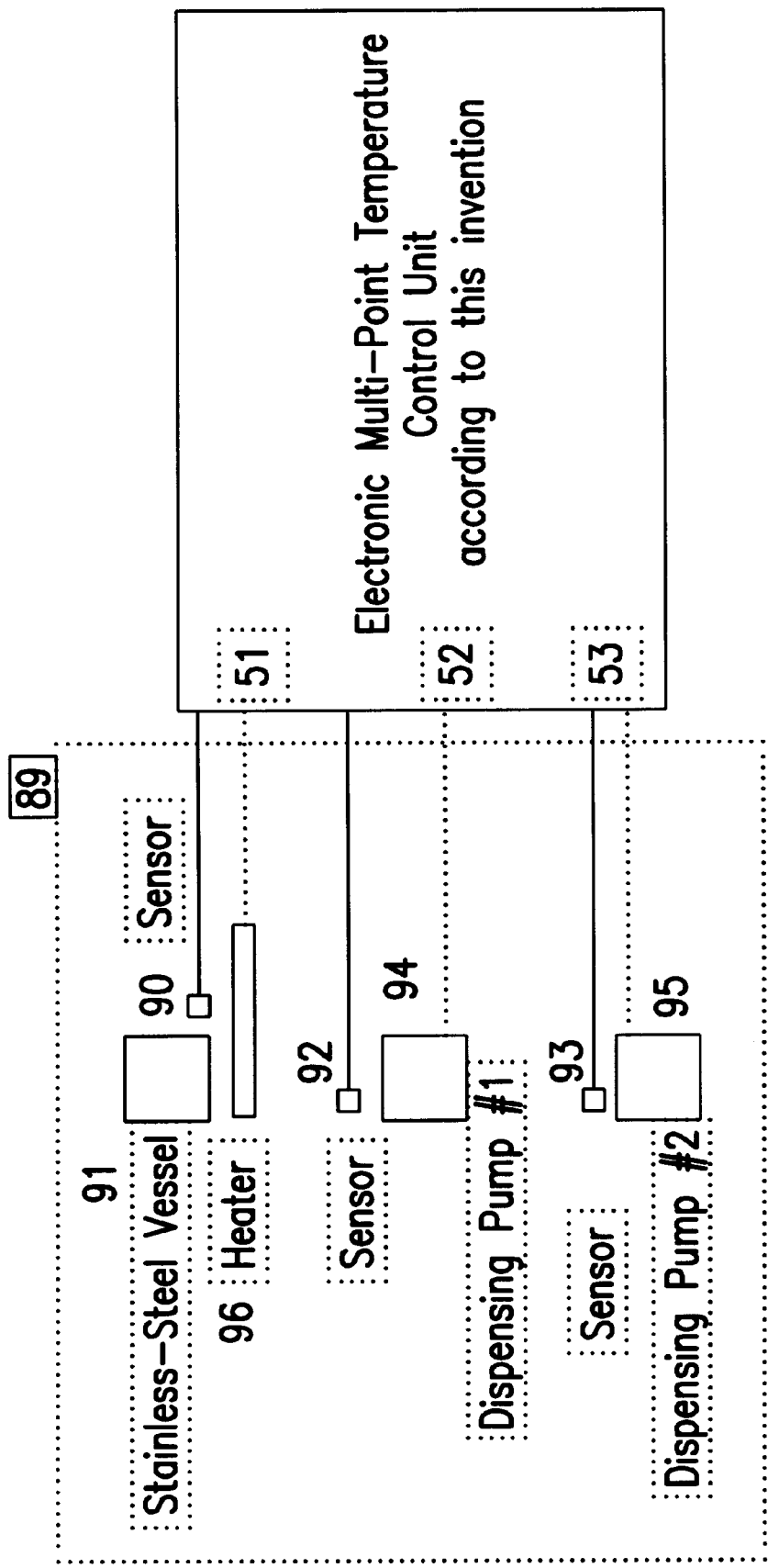
FIG. 10 shows an application of the electronic multi-point temperature control unit in a coffee-vending machine.

FIG. 10 shows an application of the electronic multi-point temperature control unit in a coffee vending machine (89) using three electronic thermostat control units and three output drive and protection circuits. A temperature sensor (90) located in contact with the stainless-steel vessel (91) containing the water for the coffee, measures the temperature of the water as it is healed. Second and third sensors (92) and (93) located on the housing of the hot-water dispensing pump (94) and the milk dispensing pump (95) monitor the temperature of the pumps in order to provide thermal overload protection. The outputs from the three solid state switches (51) to (53) are connected to the heater (96), and the said hot-water dispensing pump (94) and said milk-dispensing pump (95) to monitor the required temperature.

Figure 11:
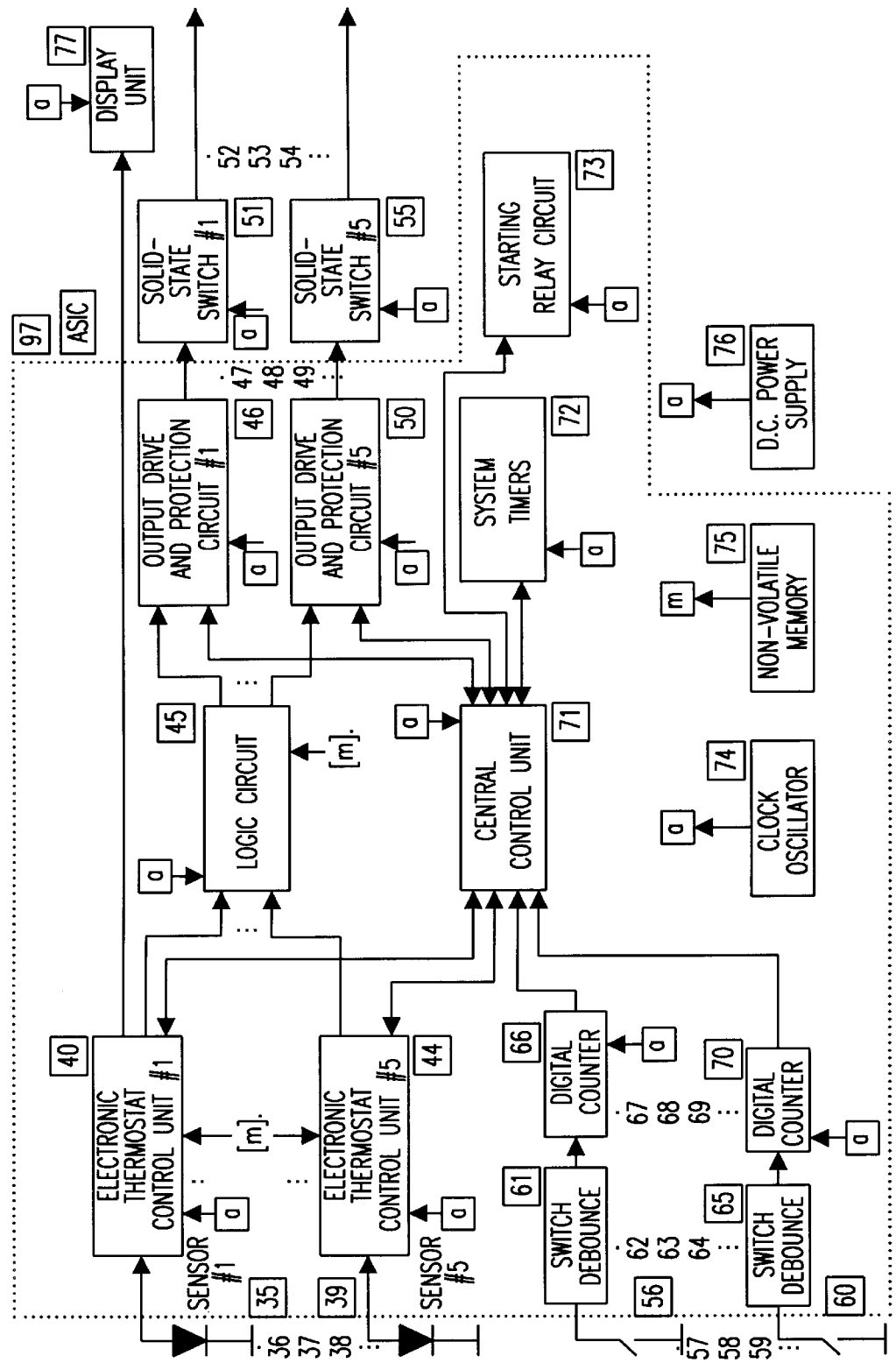
FIG. 11 shows an embodiment in which the entire circuit except the sensors, switches, DC power supply, solid state switches, and display unit is implemented as an Application Specific Integrated Circuit (ASIC).

FIG. 11 shows an implementation of the electronic multi-point temperature control unit in the form of a custom Application Specific Integrated Circuit (ASIC) (97), in which the sensors (35) to (39) of the electronic thermostat control units, user control switches (56) to (60), DC power supply (76) and solid state switches (51) to (55) are excluded, to provide a solution that is both very miniature and cost-effective.

Figure 12:
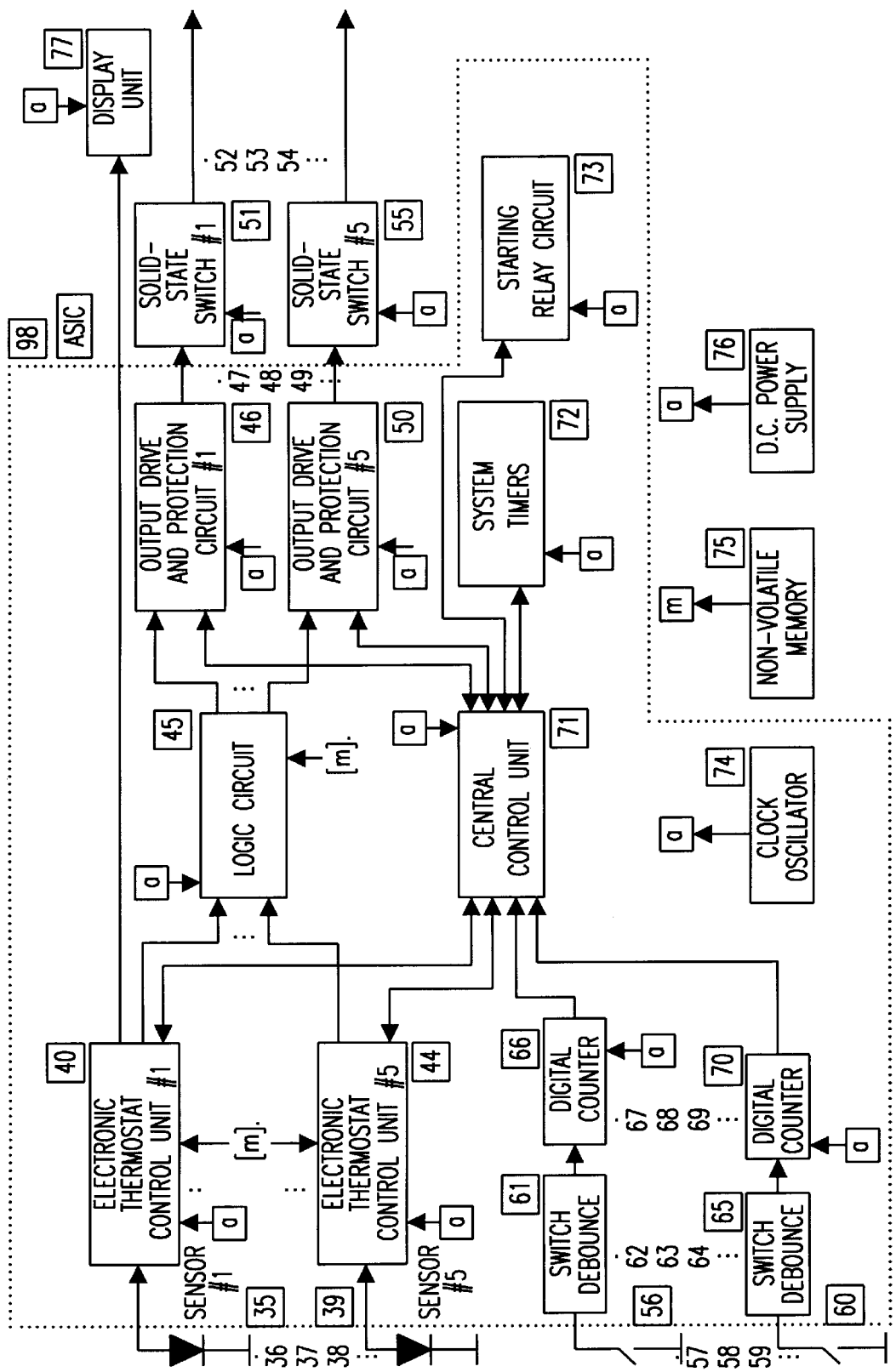
FIG. 12 shows an embodiment in which the entire circuit except the sensors of the electronic thermostat control units, switches, DC power supply, solid state switches, the non-volatile memory and the display unit is implemented as an Application Specific Integrated Circuit (ASIC).

FIG. 12 shows another embodiment electronic multi-point temperature control unit using an ASIC (98) in which the sensors (35) to (39) of the electronic thermostat control units, user control switches (56)to (60), DC power supply (76) and solid state switches (51) to (55), and the non-volatile memory (75), are external to the ASIC in order to provide for larger data storage and to interface to several different types and sizes of displays.

Working:

Multiple Electronic Thermostat Control Units (40) to (44) having a common non-volatile memory (75), monitor the temperature at different points of the environment that is to be controlled for temperature. The outputs form each of the control latch units of the said electronic thermostat control units connect to a logic circuit (45) which selectively connects them to the inputs of one or more output drive and protection circuits (46) to (50), in accordance with the data received from the said non-volatile memory (75). Each electronic thermostat control unit monitors the temperature in the compartment in which it is located and compares it with the specified 'cut-out' and 'cut-in' temperature, enabling its corresponding output drive and protection circuit whenever the monitored temperature crosses the 'cut in' limit and disabling it whenever the monitored temperature crosses the 'cut out' limit. The outputs from the output drive and protection circuits (46) to (50) connect to the inputs of solid state switches (51) to (55) through the said output drive and protection circuits which drive and monitor the load (blower, compressor, heater, pump or solenoid valve of the refrigeration/heating system). Any one or more of the output drive and protection circuits (46) include a 'Soft Start' Circuit (46A), thermal over-load protection circuit (46B) and over-current protection circuit (46C) to provide an effective reduced voltage start-up to the load, during the initial period of turn-on and thereby decrease the in-rush current stress produced on the load in case of motor and heater loads a protection against thermal and current over-load conditions A central control unit (71) receives user control values from switches (56) to (60) after routing through switch debounce circuits (61) to (65) to eliminate spurious transitions and digital counters (66) to (70) to produce a digital value. The said central control unit also receives inputs from a system timers unit (72) which supplies control signals from one or more internal timers, as well as from a starting relay circuit (73) which generates the signals required to supply timed 'ON' pulses to motor 'START' windings when these are turned ON. The said Central Control circuit produces enable/disable control signals for each of the electronic thermostat control units and output drive and protection circuits, based on the values of its input signals, and thereby performs the control actions necessary for the operation of the entire electronic multi-point temperature control unit as well as of application-specific modes of operation (e.g. "Defrost" and "Quick Freeze" modes in the case of a refrigerator).

I claim:

1. An electronic digital thermostat control unit comprising:

a p-n junction temperature sensing element;

a constant current source to drive the said p-n junction sensing element;

an analog-to-digital converter coupled to the output of the said p-n junction element to produce a digital output;

a non-volatile memory storing calibration data a correcting circuit coupled to the analog-to-digital converter for correcting the digital output for sensitivity and offset values of the sensing element using the calibration data stored in the non-volatile memory and generating a corrected output;

at least one digital comparator having first and second inputs, the first input coupled to the corrected output from the correcting circuit and the second input coupled to a digital reference value, the digital comparator generating an output when the corrected output matches the digital reference value;

a control latch having an input that is to set and/or reset in response to the output of digital comparator for actuating a load comprising a temperature correction device in a consumer/industrial product.

2. An electronic digital thermostat control unit as claimed in claim 1, and further comprising a digital noise filter connected between the digital comparator and the input of the control latch.

3. An electronic digital thermostat unit as claimed in claim 1, and further comprising a solid state switch connected to the output of said control latch for driving the load.

4. An electronic digital thermostat control unit as claimed in claim 3, and further comprising an output drive and protection circuit connected to the output of the control latch that monitors load conditions continuously and deactivates a drive to the solid state switch if overload conditions are detected in said consumer/industrial product.

5. An electronic digital thermostat control unit as claimed in claim 4, wherein said output drive and protection circuit includes a thermal protection circuit, an over-current protection circuit and a voltage start-up circuit, the thermal protection circuit monitors the temperature of a load, the over-current protection circuit monitors current drawn by the load and the voltage start-up circuit provides an effective reduced voltage start-up to the load during an initial period of turn-on and thereby decreases in-rush current stress produced on the load.

6. An electronic digital thermostat control unit as claimed in claim 1, and further comprising a variable control means for varying the digital reference value supplied to the digital comparator for adjustment of temperature control limits.

7. An electronic digital thermostat control unit as claimed in claim 6, wherein the variable control means comprises a potentiometer, an analog-to-digital converter connected in series therewith and a multiplexer, for varying the digital reference value fed to the digital comparator for adjustment of the temperature control limits.

8. An electronic digital thermostat control unit as claimed in claim 6, and further comprising a switch debounce circuit, a digital counter and a digital multiplexer, wherein the variable control means is a switch which is coupled to the switch debounce circuit which drives the digital counter, the output of said digital counter being connected to the input of the digital multiplexer, which determines whether a user defined reference value from the switch or a digital reference value from the non-volatile memory is to be used as the digital reference value for the digital comparator.

9. An electronic thermostat control unit as claimed in claim 6, and further comprising a selection switch and a temperature display unit, wherein the temperature display unit is connected to one of the inputs of the digital comparator and receives as input the digital output from the correction circuit, wherein the selection switch permits the selective display of either a sensed temperature or the digital reference value.

10. An electronic digital thermostat control unit as claimed in claim 1, wherein all elements except the sensing element are implemented as a custom Application Specific Integrated Circuit (ASIC).

11. An electronic digital thermostat control unit as claimed in claim 4, wherein all elements except the sensing element are implemented as a custom Application Specific Integrated Circuit (ASIC).

12. An electronic digital thermostat control unit as claimed in claim 2, wherein all elements except the sensing element are implemented as a custom Application Specific Integrated Circuit (ASIC).

13. An electronic digital thermostat control unit as claimed in claim 1, and further comprising a power supply comprising a low loss capacitive voltage dropping network, a voltage clamping device, a rectifier and a filter network to provide a DC voltage.

14. An electronic digital thermostat control unit as claimed in claim 1, and further comprising a clock oscillator for supply timing signals necessary for the operation of each circuit element of the electronic thermostat control unit.

15. An electronic digital thermostat control unit as claimed in claim 14, wherein all elements except the sensing element are implemented as a custom Application Specific Integrated Circuit (ASIC).

16. An electronic digital thermostat control unit as claimed in claim 1, wherein all elements except the non-volatile memory and the sensing element are implemented as a custom Application Specific Integrated Circuit (ASIC).

17. An electronic digital thermostat control unit as claimed in claim 8, wherein all elements except the sensing element and the variable control means are implemented as a custom Application Specific Integrated Circuit (ASIC).

18. An electronic digital thermostat control unit as claimed in claim 7, wherein all elements except the sensing element and the variable control means are implemented as a custom Application Specific Integrated Circuit (ASIC).

19. An electronic multi-point temperature control unit comprising:
a plurality of electronic thermostat control units, each electronic thermostat control unit comprising:
a p-n junction temperature sensing element;
a constant current source to drive said p-n junction element;
an analog-to-digital converter coupled to the output of said p-n junction element to produce a digital output;
a correcting circuit coupled to the analog-to-digital converter for correcting the digital output for sensitivity and offset values of the sensing element using calibration data and generating a corrected output;
at least one digital comparator having first and second inputs, the first input coupled to the corrected output from the correcting circuit and the second input coupled to a digital reference value, the digital comparator generating an output when the corrected output matches the digital reference value;
a control latch having an input that is set and/or reset in response to the output of digital comparator for actuating a load comprising a temperature correction device in a consumer/industrial product;
a common non-volatile memory that stores reference values and calibration data for each control unit to control the temperature in a plurality of locations:
one or more output drive and protection circuits;
a logic circuit, the outputs from the control latches of each electronic thermostat control unit being connected to the logic circuit which selectively connects the outputs to the one or more output drive and protection circuits based on data stored in the non-volatile memory;
a central control unit connected to each of the outputs from the control latches of the electronic thermostat control units and the inputs of the output drive and protection circuits for enabling or disabling the electronic thermostat control units and the output of said drive and protection circuits depending upon a combination of the output from the electronic thermostat control unit and user control input;
a system timer unit coupled to the central control unit which generates timing signals for enabling/disabling one or more of the said output drive and protection circuits during modes of operation; and
a starting relay circuit coupled to the central control unit which outputs signals to control one or more output drive and protection circuits when a load is to be switched on.

20. An electronic multi-point temperature control unit as claimed in claim 19, wherein any one or more of the output drive and protection circuits include a thermal protection circuit, an over-current protection circuit and a voltage start-up circuit, the thermal protection circuit monitors the temperature of a load, the over-current protection circuit monitors the current drawn by the load, and the voltage start-up circuit provides an effective reduced voltage start-up to the load during an initial period of turn-on and thereby decreases in-rush current stress produced in the load.

21. An electronic multi-point temperature control unit as claimed in claims 19, wherein the central control unit is a logic circuit programmable for implementing functions for refrigeration and heating systems.

22. An electronic multi-point temperature control unit as claimed in claim 19, and further comprising a clock oscillator for supplying timing signals necessary for the operation of each circuit element of each electronic thermostat control unit.

23. An electronic multi-point temperature control unit as claimed in claim 19, and further comprising a switch debounce circuit, a digital counter and at least one user control switch connected through the switch debounce circuit and the digital counter to the input of the central control unit for providing a user control signal including a digital reference value required to operate the electronic multi-point temperature control unit.

24. An electronic multi-point temperature control unit as claimed in claim 19, wherein all of the elements except the sensing element are implemented as a custom Application Specific Integrated Circuit (ASIC).

25. An electronic multi-point temperature control unit as claimed in claim 22, wherein all elements except the sensing element are implemented as a custom Application Specific Integrated Circuit (ASIC).

26. An electronic multi-point temperature control unit as claimed in claim 19, and further comprising a power supply comprising a low loss capacitive voltage dropping network, a voltage clamping device, a rectifier and a filter network to provide a DC voltage to each electronic thermostat control unit.

27. An electronic multi-point temperature control unit as claimed in claim 23, wherein all elements except the user control switch and the sensing element are implemented as a custom Application Specific Integrated Circuit (ASIC).

28. An electronic multi-point temperature control unit as claimed in claim 19, further comprising a digital noise filter connected between the digital comparator and the input of the control latch of the electronic digital thermostat control unit.

29. An electronic multi-point temperature control unit as claimed in claim 28, wherein all elements except the sensing element are implemented as a custom Application Specific Integrated Circuit (ASIC).

* * * * *